United States Patent
Kelly et al.

(10) Patent No.: US 7,346,906 B2
(45) Date of Patent: Mar. 18, 2008

(54) WORKLOAD MANAGEMENT IN A COMPUTING ENVIRONMENT

(75) Inventors: Vernon B. Kelly, Cheshire, CT (US); Ian K. Roome, Southbury, CT (US)

(73) Assignee: International Business Machines Corporation, Armonk, NY (US)

( * ) Notice: Subject to any disclaimer, the term of this patent is extended or adjusted under 35 U.S.C. 154(b) by 917 days.

(21) Appl. No.: 10/192,367

(22) Filed: Jul. 9, 2002

(65) Prior Publication Data
US 2004/0194090 A1 Sep. 30, 2004

(51) Int. Cl.
*G06F 9/00* (2006.01)

(52) U.S. Cl. .................... 718/105; 718/101; 707/1; 707/3

(58) Field of Classification Search ............ 718/100, 718/104, 105, 101; 705/8, 10; 707/1, 3
See application file for complete search history.

(56) References Cited

U.S. PATENT DOCUMENTS

| | | | | |
|---|---|---|---|---|
| 4,852,001 A | | 7/1989 | Tsushima et al. ............ 364/401 |
| 5,006,978 A | * | 4/1991 | Neches ........................ 718/102 |
| 5,031,089 A | | 7/1991 | Liu et al. .................... 364/200 |
| 5,463,775 A | * | 10/1995 | DeWitt et al. .............. 702/186 |
| 5,473,773 A | | 12/1995 | Aman et al. ................. 395/650 |
| 5,613,113 A | | 3/1997 | Goldring ..................... 395/618 |
| 5,745,652 A | | 4/1998 | Bigus .......................... 395/22 |
| 5,745,674 A | | 4/1998 | Lupton et al. ......... 395/182.18 |
| 5,826,239 A | | 10/1998 | Du et al. ........................ 705/8 |
| 5,920,857 A | * | 7/1999 | Rishe et al. ................... 707/3 |
| 6,041,306 A | | 3/2000 | Du et al. ........................ 705/8 |
| 6,092,086 A | * | 7/2000 | Martin et al. ............... 707/202 |
| 6,173,306 B1 | * | 1/2001 | Raz et al. .................... 718/102 |
| 6,275,863 B1 | | 8/2001 | Leff et al. ................... 709/248 |
| 6,308,163 B1 | | 10/2001 | Du et al. ........................ 705/8 |
| 6,622,152 B1 | * | 9/2003 | Sinn et al. ................... 707/204 |
| 6,760,684 B1 | * | 7/2004 | Yang et al. ................. 702/182 |
| 2002/0059539 A1 | * | 5/2002 | Anderson ....................... 714/6 |

* cited by examiner

*Primary Examiner*—William Thomson
*Assistant Examiner*—Phuong N Hoang
(74) *Attorney, Agent, or Firm*—Geraldine Monteleone, Esq.; Kevin P. Radigan, Esq.; Heslin Rothenberg Farley & Mesiti, P.C.

(57) ABSTRACT

Workloads, as defined by customers, are tracked on an individual basis. This tracking enables a customer to identify the amount of resources consumed by a particular workload. The customer defines the workload to be tracked, and that workload is tracked using a Unit of Work value. The Unit of Work value ensures that there is an accounting for the resources attributable to that workload.

17 Claims, 11 Drawing Sheets

| i | j | WORKLOAD Wi | WORKLOAD LEAD TRANS. WiTj | WORKLOAD NAME WNi | OTHER WORKLOAD SELECTION CRITERIA WiOTj |
|---|---|---|---|---|---|
| 1 | 1 | 1 | TRN1 | 'EXAMPLE WORKLOAD NAME' | • |
| ⋮ | ⋮ | ⋮ | ⋮ | ⋮ | ⋮ |
| n | m | n | • | • | • |

602

700

500 →
SMF RECORD TYPE=101, SUBTYPE=0, DB2 NAME=DB2C, UOW=879, PLAN=CPLAN1, CPU SECONDS=.500, PAGES UPDATED=33, OTHER RESOURCE FIELDS...
⌒516

520 →
SMF RECORD TYPE=101, SUBTYPE=0, DB2 NAME=DB2D, UOW=879, PLAN=CPLAN2, CPU SECONDS=1.600, PAGES UPDATED=08, OTHER RESOURCE FIELDS...

530 →
SMF RECORD TYPE=110, SUBTYPE=1, CICS NAME=CICSB, UOW=879, TRANSACTION=TRN2, CPU SECONDS=.654, FILE I/O=50, START TIME=29MAR2001:10:00:02.000000, ENDTIME=29MAR2001:10:00:04.300000, OTHER RESOURCE FIELDS...
⌒550

SMF RECORD TYPE=110, SUBTYPE=1, CICS NAME=CICSA, UOW=879, TRANSACTION=TRN1, CPU SECONDS=.215, FILE I/O=50, START TIME=29MAR2001:10:00:01.000000, ENDTIME=29MAR2001:10:00:05.000000, OTHER RESOURCE FIELDS...
⌒560 fig. 5

| i | j | WORKLOAD $W_i$ | WORKLOAD LEAD TRANS. $WiT_j$ | WORKLOAD NAME $WN_i$ | OTHER WORKLOAD SELECTION CRITERIA $WiOT_j$ |
|---|---|---|---|---|---|
| 1 | 1 | 1 | TRN1 | 'EXAMPLE WORKLOAD NAME' | • |
| ... | ... | ... | ... | ... | ... |
| n | m | n | • | • | • | fig. 7

SMF RECORD TYPE=110, SUBTYPE=1, CICS NAME=CICSB, UOW=879, TRANSACTION=TRN2, CPU SECONDS=.654, FILE I/O=50, START TIME=29MAR2001:10:00:02.000000, ENDTIME=29MAR2001:10:00:04.300000, WORKLOAD NAME = EXAMPLE WORKLOAD NAME, OTHER RESOURCE FIELDS...

SMF RECORD TYPE=110, SUBTYPE=1, CICS NAME=CICSA, UOW=879, TRANSACTION=TRN1, CPU SECONDS=.215, FILE I/O=50, START TIME=2MAR2001:10:00:01.000000, ENDTIME=29MAR2001:10:00:05.000000, WORKLOAD NAME=EXAMPLE WORKLOAD NAME, OTHER RESOURCE FIELDS...

SMF RECORD TYPE=101, SUBTYPE=0, DB2 NAME=DB2C, UOW=879, PLAN=CPLAN1, CPU SECONDS=.500, PAGES UPDATED=33, WORKLOAD NAME=EXAMPLE WORKLOAD NAME, OTHER RESOURCE FIELDS...

SMF RECORD TYPE=101, SUBTYPE=0, DB2 NAME=DB2D, UOW=879, PLAN=CPLAN2, CPU SECONDS=1.600, PAGES UPDATED=08, WORKLOAD NAME=EXAMPLE WORKLOAD NAME, OTHER RESOURCE FIELDS...

| i | j | WORKLOAD Wi | WORKLOAD LEAD TRANS. WiTj | WORKLOAD NAME WNi | OTHER WORKLOAD SELECTION CRITERIA WiOTj |
|---|---|---|---|---|---|
| 1 | 1 | 1 | **** | 'CICSA ORIGIN WORKLOAD' | CICS NAME=CICSA |
| 2 | 1 | 2 | **** | 'CICSB ORIGIN WORKLOAD' | CICS NAME=CICSB | fig. 9

WORKLOAD MANAGEMENT IN A COMPUTING ENVIRONMENT

TECHNICAL FIELD

This invention relates, in general, to processing within a computing environment, and in particular to tracking workloads processed by one or more systems of the computing environment.

BACKGROUND OF THE INVENTION

Computing environments are capable of processing various workloads for one or more customers. For example, one customer may have a workload relating to an e-business, and another workload relating to a legacy system, while yet another customer may have a workload relating to a distributed service.

Further, a workload may be processed by one or more systems of the computing environment. For example, a workload may include transactions processed by various systems, such as the Customer Information Control System (CICS) and Database2 (DB2) system, offered by International Business Machines Corporation, Armonk, N.Y.

Today, it is possible to track the amount of resources being used by the various systems processing the workloads. For instance, capabilities exist that indicate the total amount of resources consumed by CICS for the workloads processed by CICS, or the total amount of resources consumed by DB2 for the activity performed by DB2. However, it is desirous to be able to track the amount of resources consumed by a particular workload, separate from other workloads.

Thus, a need exists for a capability that enables the tracking of customer defined workloads. In particular, a need exists for a capability that enables the tracking of resources used to process distinct workloads of a computing environment.

SUMMARY OF THE INVENTION

The shortcomings of the prior art are overcome and additional advantages are provided through the provision of a method of tracking workloads of a computing environment. The method includes, for instance, creating a workload definition corresponding to a customer defined workload to be tracked; and tracking, using the workload definition, the customer defined workload processed by one or more systems of the computing environment.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 5 depicts one embodiment of recorded entries, in accordance with an aspect of the present invention;

FIG. 7 depicts one embodiment of entries of the workload definitions file of FIG. 6a, in accordance with an aspect of the present invention;

FIG. 8a depicts one embodiment of entries of a CICS workloads file, in accordance with an aspect of the present invention;

FIG. 8b depicts one embodiment of entries of a DB2 workloads file, in accordance with an aspect of the present invention; and FIG. 9 depicts another embodiment of entries of the workload definitions file of FIG. 6a, in accordance with an aspect of the present invention.

BEST MODE FOR CARRYING OUT THE INVENTION

In accordance with an aspect of the present invention, a capability is provided for tracking customer defined workloads. For example, a customer may request that resources (e.g., CPU cycles, memory usage, etc.) of a particular workload (e.g., an e-business, a legacy system, a distributed service, etc.) be tracked. This enables the customer to know the amount of resources consumed by any particular workload.

Figure 1:
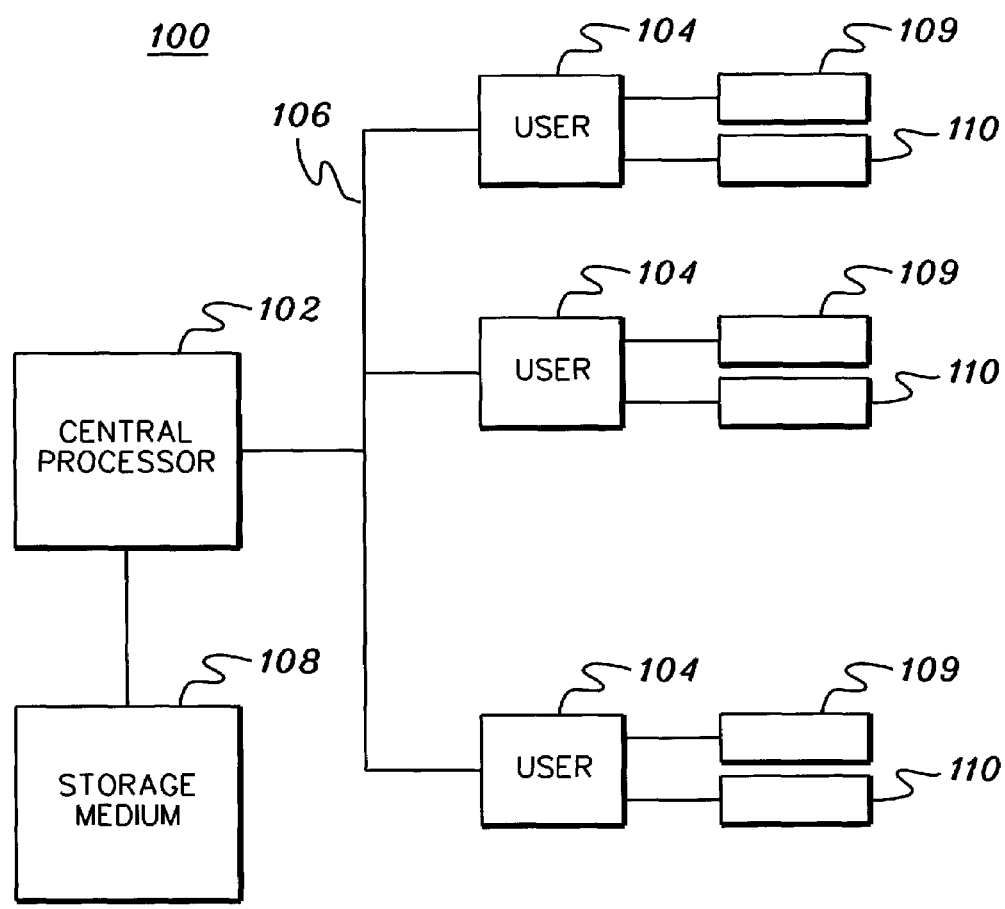
FIG. 1 depicts one embodiment of a computing environment incorporating and using one or more aspects of the present invention.

One embodiment of a computing environment incorporating and using one or more aspects of the present invention is depicted in FIG. 1 and described herein. As one example, a computing environment 100 includes a central processor 102, such as a System/390 or zSeries mainframe computer offered by International Business Machines Corporation, Armonk, N.Y., coupled to a plurality of user devices 104 via a network 106. Further, central processor 102 is coupled to a non-volatile storage medium 108.

In one example, user 104 includes a processor, such as an xSeries personal computer offered by International Business Machines Corporation, Armonk, N.Y. It further includes a user display device 109, such as a video display, and an interactive input device 110, such as a keyboard. In one instance, a user may represent a mechanized computer process being capable of submitting millions of transactions on a daily basis over network 106 to central processor 102.

Figure 2:
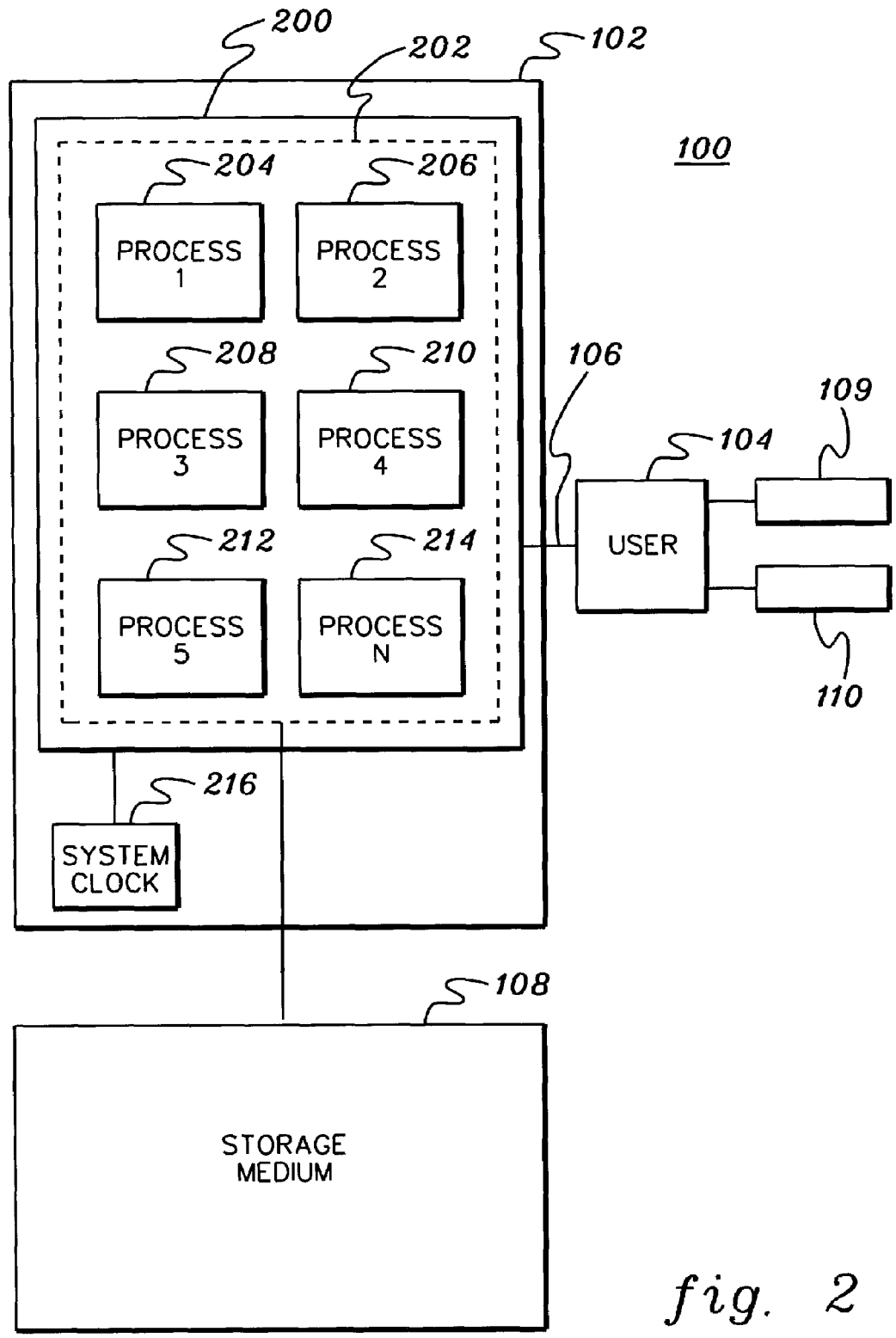
FIG. 2 depicts further details of the central processor of FIG. 1, in accordance with an aspect of the present invention.

Further details regarding central processor 102 are described with reference to FIG. 2, in which a single user 104 is depicted. In one embodiment, central processor 102 includes an operating system 200, such as the OS/390 or zOS operating system offered by International Business Machines Corporation, Armonk, N.Y.; a memory unit 202, and a plurality of processes 204-214. Coupled to operating system 200 is a system clock 216. In one example, the system clock is a high-resolution system clock, which is constantly updated while central processor 102 is operating. The contents of system clock 216 are known by operating system 200 and the processes of memory unit 202.

Further details regarding computer memory unit 202 and storage medium 108 are described with reference to FIG. 3. While the examples of FIG. 3 relate to CICS and DB2 systems, these are only examples. One or more aspects of the present invention are applicable to other systems as well, such as, for instance, IMS, MQSeries, WebSphere, etc.

Figure 3:
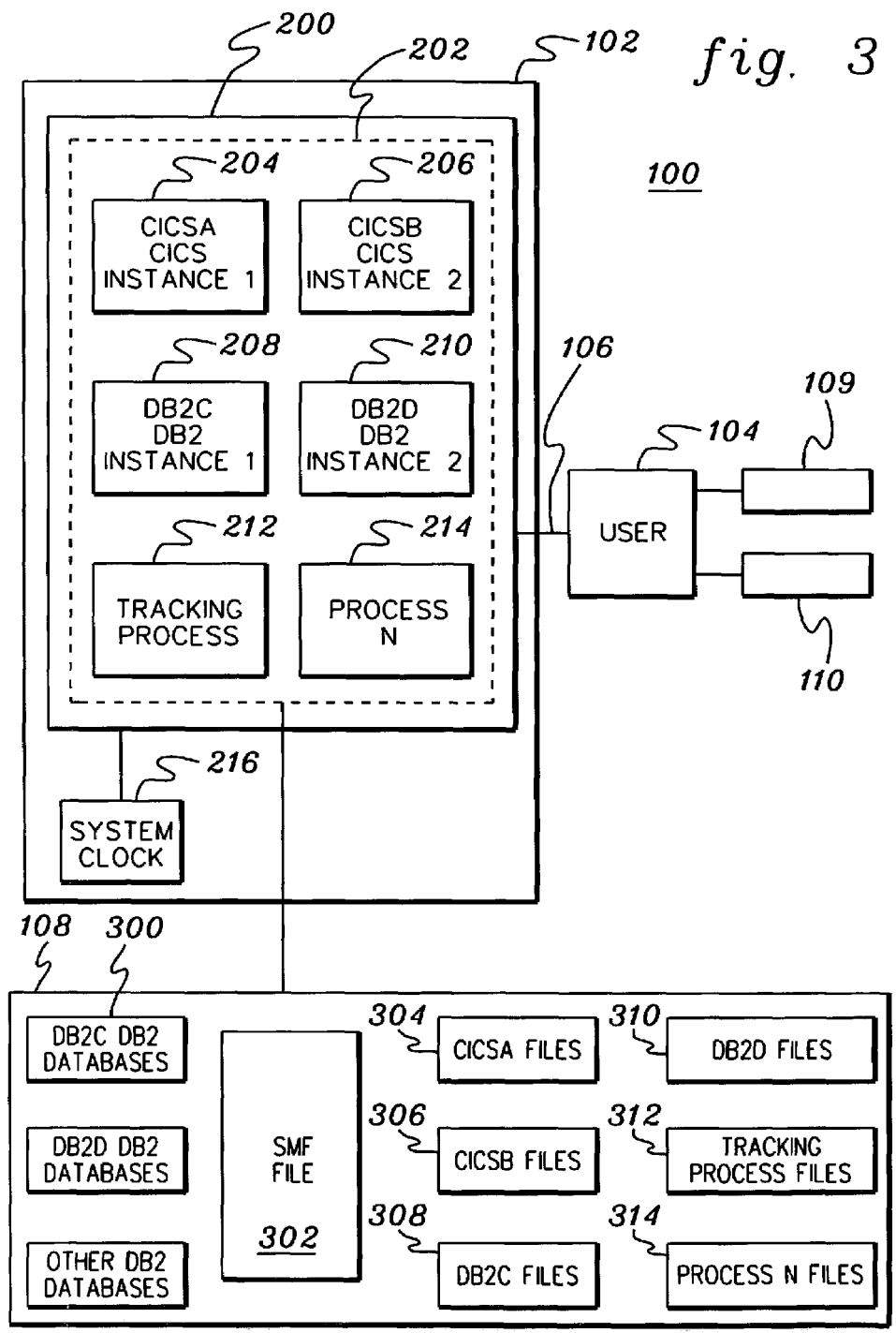
FIG. 3 depicts further details of various components of the computing environment of FIG. 1, in accordance with an aspect of the present invention.

With reference to FIG. 3, an embodiment of the present invention is described in which CICS transactions and DB2 work activity (plans) are tracked for particular workloads. As used herein, the term transaction refers to the name of a collection of computer program instructions that a process (such as CICS) directly executes. The term lead transaction is used herein to refer to a transaction name that a user 104 of computing environment 100 submits to a process, such as CICSA, in order to direct the computing environment to perform work. The term plan is used herein to refer to the name of a collection of computer program instructions that a process (such as DB2) directly executes.

In one embodiment, an aspect of the present invention uses in its tracking a concept known as the Unit of Work (UOW), which is shared by the architectures of CICS and DB2. A Unit of Work value may be thought of as a unique identification that is an inherent part of an initial lead transaction. In one example, both the CICS UOW and the DB2 UOW include two elements, the first being a date and high-resolution time value derived from system clock 216, and the second being the network name of the user that is available to processes 204-214. CICS before executing a transaction examines the transaction to see if the transaction has a Unit of Work defined and uses that Unit of Work during execution, if present. Otherwise, CICS assigns a unique Unit of Work to the transaction before executing the transaction. Additionally, a transaction's UOW is passed to any other CICS transactions or any other DB2 work activity (plan) that is performed as a logical consequence of the CICS lead transaction's execution requests.

Typically, there are millions of unique UOW values assigned to CICS lead transactions each day. For purposes of clarity, however, one example of an UOW value of 879 is used herein in the examples. Further details regarding the UOW may be found in the following references: International Business Machines Document CICS Transaction Server for OS/390, Performance Guide, Release 3, Number SC33-1699-02, Section 2.4.2.4 Combining CICS and DB2 performance data, and International Business Machines Document CICS Transaction Server for OS/390, Release Guide, Release 3, Number GC34-5352-01, APPENDIX 1.1.2.1.13 Performance data in group DFHTASK, each of which is hereby incorporated herein by reference in its entirety.

Referring to FIG. 3, in this example, multiple instances of CICS and DB2 are executing to meet the information processing requirements of underlying business applications that use the services of CICS and DB2. A user 104 of computing environment 100 submits a lead transaction to a specific instance of CICS, such as CICSA, at which point the lead transaction acquires a CICS UOW, such as 879. If the lead transaction cannot meet the complete information requirements of the request, then a secondary CICS transaction could be invoked inheriting the CICS UOW of 879, either in the same process (CICSA) or in another CICS process, such as CICSB. In that case, the initial transaction (in CICSA) would wait for the invoked secondary transaction to complete and return the requested information.

Similarly, a lead transaction or secondary transaction may require information contained in a DB2 database, such as the DB2C DB2 DATABASE 300 owned by DB2C. Thus, the transaction on CICSA invokes a DB2 plan on DB2C that performs the database activity and inherits a DB2 UOW of 879 passed on to it by the waiting CICS transaction in CICSA. When the DB2 plan ends on DB2C, it returns the requested information to the waiting CICS transaction in CICSA.

In one example, CICS transaction activity and DB2 plan activity are recorded in a Systems Management Facility (SMF) file 302 by CICS and DB2 processes. SMF is a component of the OS/390 and zOS operating systems offered by International Business Machines Corporation. When an operating system is initially installed on central processor 102, SMF file 302 is created in storage unit 108. The information recorded in the SMF file is analyzed and used in tracking distinct workloads, in accordance with an aspect of the present invention, by a post-process tracking process 212, as described in further detail below.

Figure 4:
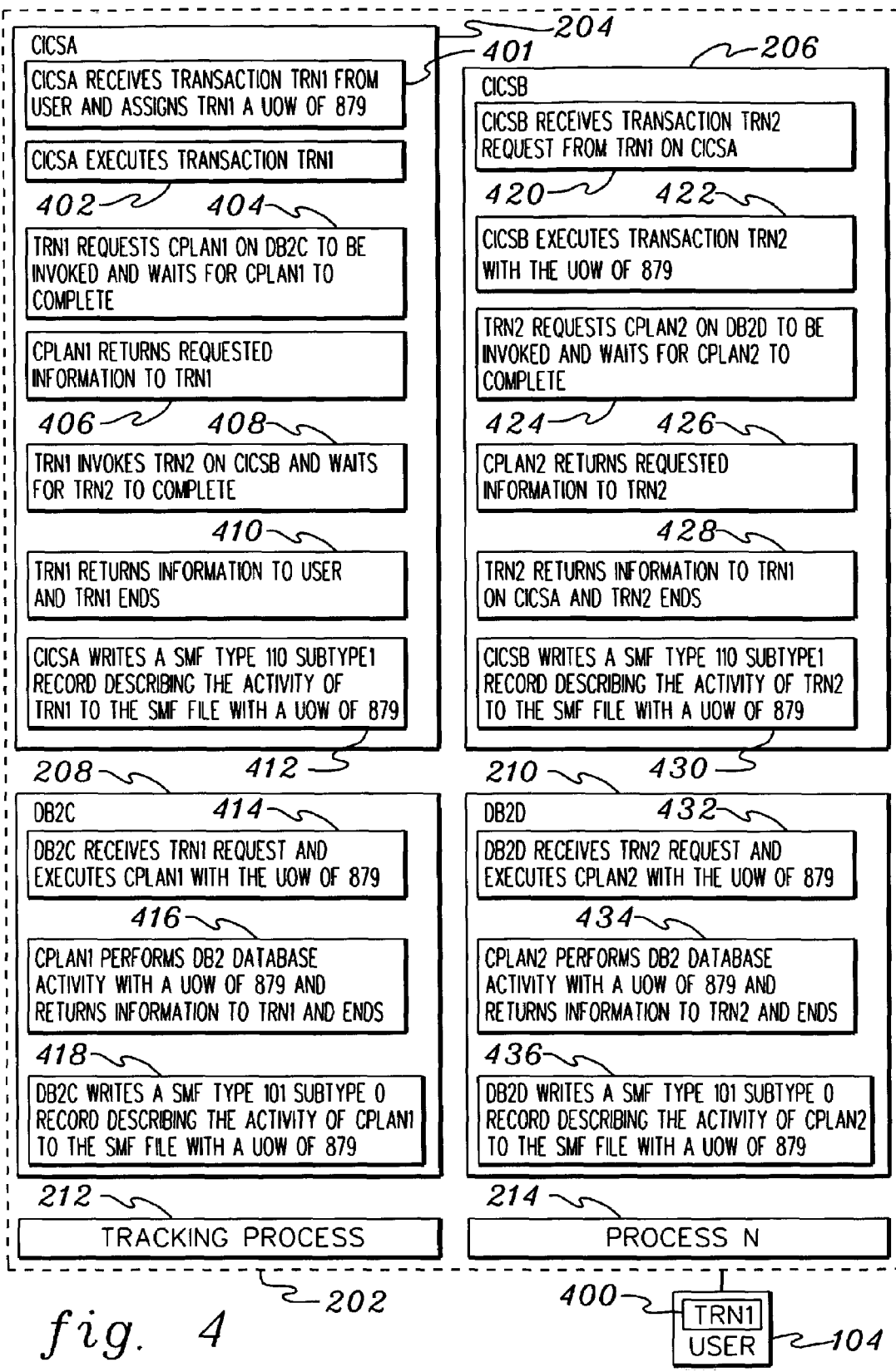
FIG. 4 depicts one embodiment of the logic associated with processing a transaction submitted by a user of the computing environment of FIG. 1, in accordance with an aspect of the present invention.

The recording of information in a SMF file is further described with reference to FIG. 4. In particular, FIG. 4 depicts one embodiment of processing steps performed in response to a transaction being submitted by a user.

In one example, user 104 submits a transaction, 400, such as a lead CICS TRN1 transaction, to a CICS process, such as CICSA. CICSA receives transaction TRN1 from the user and assigns TRN1 a UOW of 879, STEP 401. Thereafter, CICSA executes transaction TRN1, STEP 402.

During execution, TRN1 requests CPlan1 on DB2C to be invoked and waits for CPlan1 to complete, STEP 404. CPlan1 returns requested information to TRN1, STEP 406, and TRN1 invokes TRN2 on CICSB and waits for TRN2 to complete, STEP 408. TRN1 returns information to user 104, and TRN1 ends, STEP 410. Subsequently, CICSA writes a SMF entry (e.g., a record of type 110, subtype 1) to the SMF file describing the activity of TRN1 with a UOW of 879, STEP 412.

As described above, in STEP 404, TRN1 requests CPlan1 on DB2C to be invoked. One embodiment of the processing associated with DB2C is described herein with further reference to FIG. 4. When DB2C receives the TRN1 request, it executes CPlan1 with the UOW of 879, STEP 414. CPlan1 performs DB2 database activity with the UOW of 879, returns information to TRN1, and ends, STEP 416. DB2C then writes a SMF entry (e.g., a record of type 101, subtype 0) to the SMF file describing the activity of CPlan1 with the UOW of 879, STEP 418.

In addition to the above, one embodiment of the processing associated with invoking TRN2 on CICSB (STEP 408) is further described herein with reference to FIG. 4. CICSB receives the transaction TRN2 request from TRN1 on CICSA, STEP 420. Thereafter, CICSB executes transaction TRN2 with the UOW of 879, STEP 422. TRN2 requests CPlan2 on DB2 D to be invoked and waits for CPlan2 to complete, STEP 424. CPlan2 returns requested information to TRN2, STEP 426, TRN2 returns information to TRN1 on CICSA, and TRN2 ends, STEP 428. CICSB writes a SMF entry (e.g., a record of type 110, subtype 1) to the SMF file describing the activity of TRN2 with the UOW of 879, STEP 430.

One embodiment of the processing associated with invoking CPlan2 on DB2 D at STEP 424 is described herein with continuing reference to FIG. 4. When DB2 D receives the TRN2 request, it executes CPlan2 with the UOW of 879, STEP 432. CPlan2 performs DB2 database activity with the UOW of 879, returns information to TRN2, and ends, STEP 434. DB2 D then writes a SMF entry (e.g., a record of type 101, subtype 0) to the SMF file describing the activity of CPlan2 with the UOW of 879, STEP 436.

Further details of the contents of SMF file 302 are described with reference to FIG. 5. In particular, FIG. 5 depicts examples of portions of SMF file 302 written to by the processes of FIG. 4, as a result of completing the TRN1 request from user 104. As one example, a record 500 of SMF file 302 is written by DB2C at STEP 418. In one embodiment, SMF record 500 includes the following fields: a type field 502 indicating the type of record; a subtype field 504 further indicating the type of record; a DB2 name field 506 indicating the name of the DB2 process creating the record; a UOW field 508 indicating the identifier of the Unit of Work; a plan field 510 indicating the name of the plan performing the requested work; a CPU seconds field 512 indicating an amount of CPU seconds utilized by the process; a pages updated field 514 indicating the number of pages updated by performing the work; and one or more other resource fields 516. A similar record 520 is written by DB2 D at STEP 436. Note that the UOW in record 520 is the same as the UOW in record 500.

In addition to the above, records 530 and 560 are written to by CICS processes at STEPs 430 and 412, respectively. As one example, a SMF record for a CICS transaction includes the following fields: a type field 532 indicating the type of record; a subtype field 534 further indicating the type of record; a CICS name field 536 indicating the name of the CICS process writing the record; a UOW field 538 indicating the associated Unit of Work; a transaction name field 540 indicating the transaction performing the work; a CPU seconds field 542 indicating the amount of CPU resources utilized by the process; a file I/O field 544 indicating the count of the file input and output operations performed by the process; a start time field 546 indicating a starting time for the transaction and including, for instance, date and high-resolution time values obtained from the system clock by the CICS process; an end-time field 548 indicating the time the transaction completed; and other resource fields 550. Again, it is shown that the UOW in each of the records is the same (e.g., 879).

The fields depicted in the foregoing records are only examples. Additional, less and/or different fields may exist without departing from the spirit of the present invention. Further, although the records illustrated in FIG. 5 are depicted in the order in which they were written by their respective process steps, no particular order can be expected as a general rule within the SMF file. The processes that cause the records to be written are asynchronous processes that do not synchronize the SMF record writing activity to the SMF file with any other processes.

In accordance with an aspect of the present invention, SMF records are analyzed to track the resources (e.g., CPU time, memory usage, etc.) used by a particular workload, as defined by a customer. One or more workloads defined by one or more customers can be tracked. One embodiment of the logic associated with tracking a workload is described with reference to FIGS. 6a-6c. In particular, FIG. 6a depicts the logic associated with creating a workload definitions file, and FIGS. 6b-6c depict the logic associated with tracking a workload, based on the workload definitions file.

Figure 6A:
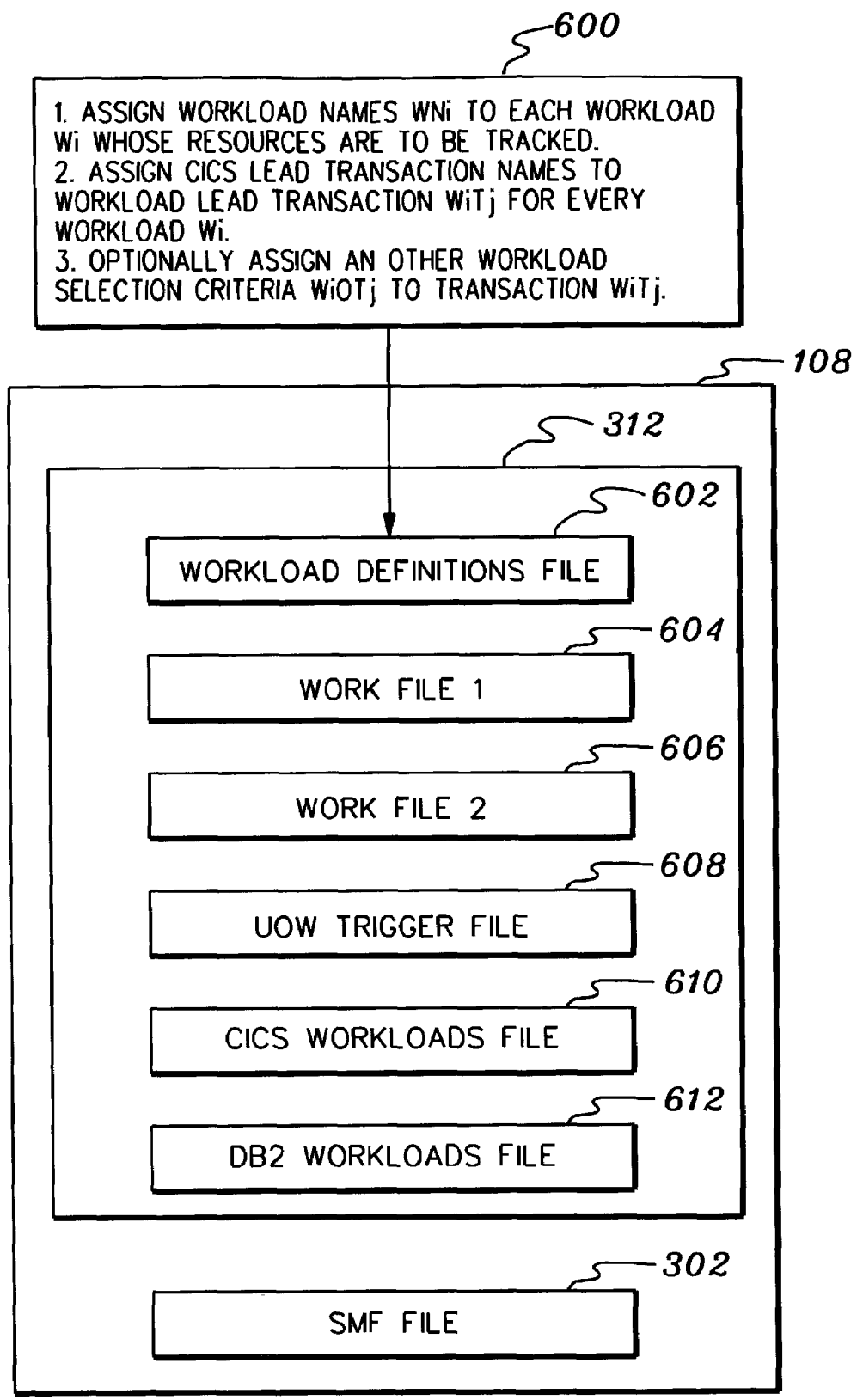
FIG. 6a depicts one embodiment of the logic associated with creating a workload definitions file, in accordance with an aspect of the present invention.
Figure 6B:
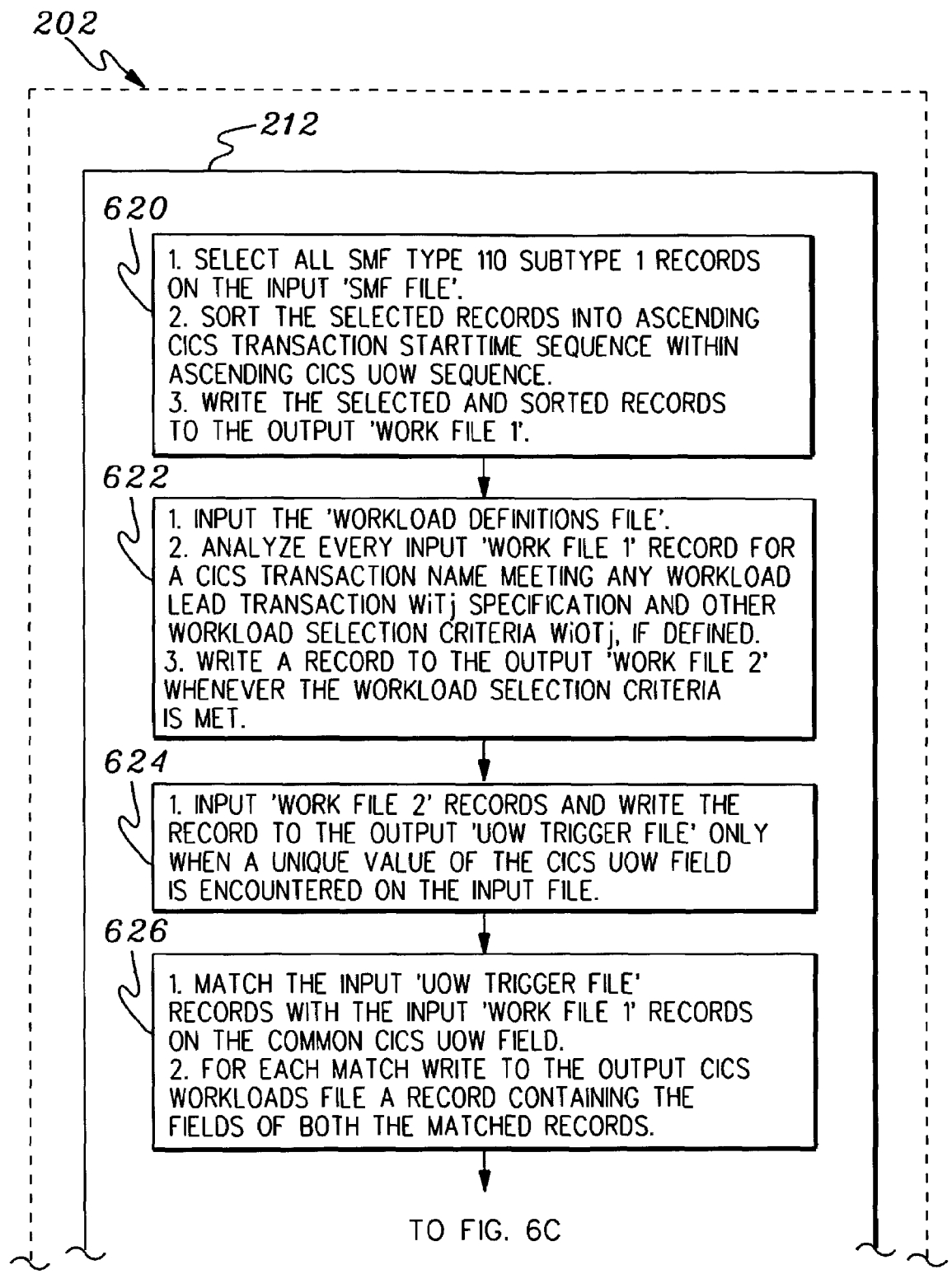
FIGS. 6b-6c depict one embodiment of the logic associated with tracking workloads based on the workload definitions file of FIG. 6a, in accordance with an aspect of the present invention.
Figure 6C:
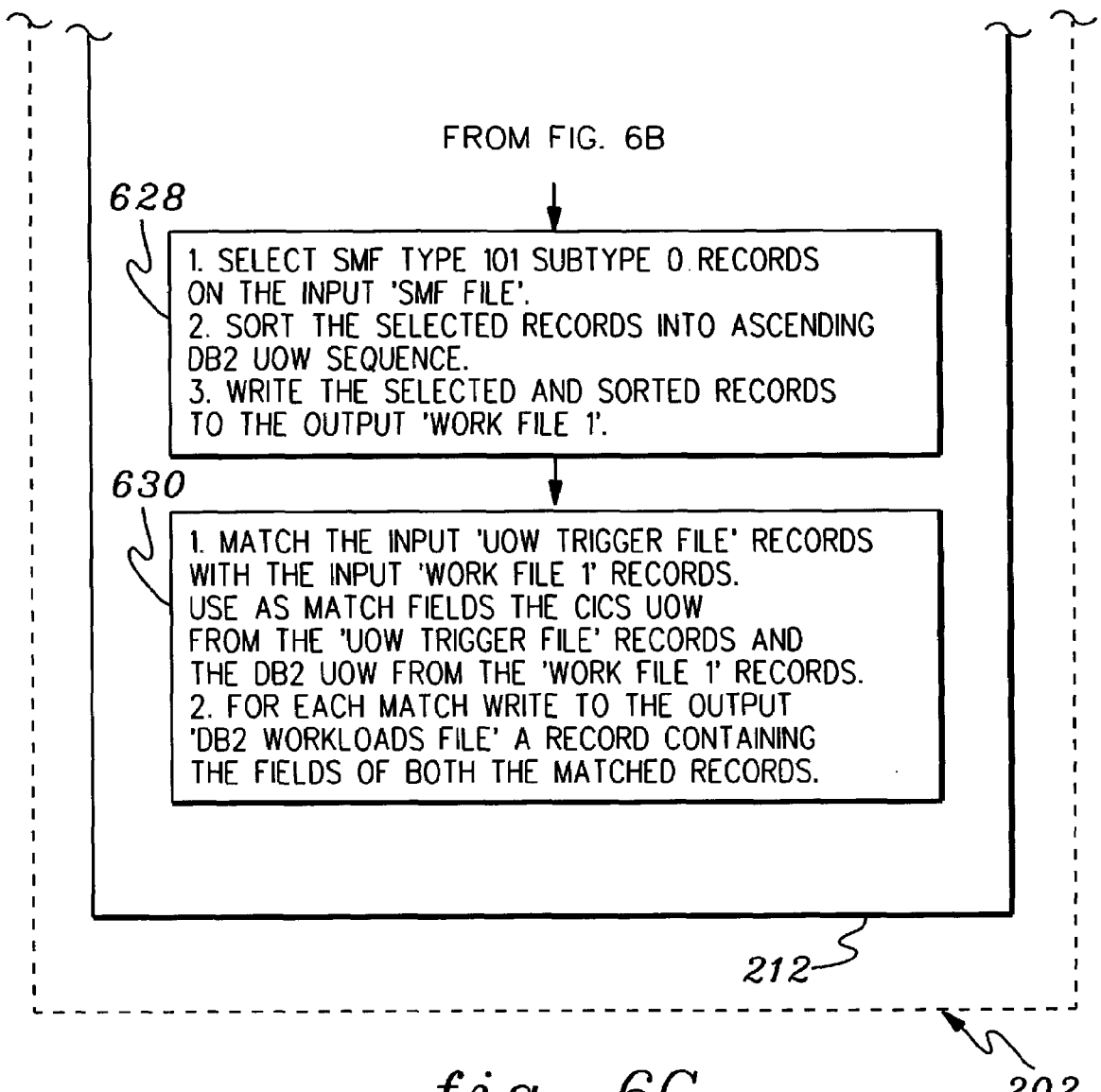

Referring to FIG. 6a, in one embodiment, a workload definitions creation process is undertaken to create a workload definitions file 602, STEP 600. As one example, the workload definitions creation process includes the following: assigning workload names, WNi, to each workload Wi whose resources are to be tracked; assigning CICS lead transaction names to workload lead transactions, WiTj, for each workload Wi; and optionally, assigning an other workload selection criteria WiOTj (e.g., a simple criterion, or a complex criterion using, for instance, boolean logic and/or wildcard terminology, etc.) to each workload lead transaction WiTj. As one example, a workload Wi may have one or more lead transactions WiTj assigned thereto. In one embodiment, WiTj and WiOTj are constructed in such a manner that the resulting logic of any combination thereof when applied to the CICS transactions included in the SMF file results in any particular CICS transaction record being selected for no more than one workload Wi.

One example of a workload definitions file 602 is described with reference to FIG. 7. As depicted in FIG. 7, workload definitions file 602 includes one or more workload definitions 700, and each workload definition includes one or more criteria, such as, for instance, the following: i and j indicating increasing integer values used as designations with the other criteria; workload (Wi) assigning a value (e.g., numeric) to the workload to be tracked; workload lead transaction (WiTj) designating the customer defined name for the transaction to be tracked; workload name (WNi) indicating a customer defined workload name; and other workload selection criteria (WiOTj) used in the selection of records associated with the workload being tracked. In one example, a value of '.' for WiOTj indicates an undefined selection criteria, which is to be ignored.

Returning to FIG. 6a, in addition to the workload definitions file, other files are also used in accordance with an aspect of the present invention. In one embodiment, these files, as well as the workload definitions file, are part of tracking process files 312 located within storage medium 108. In one example, these files include a Work File 1 604, a Work File 2 606, a UOW trigger file 608, a CICS workloads file 610, and a DB2 workloads file 612, one or more of which are used during the tracking of workloads, as described in further detail below.

One embodiment of the logic associated with tracking a customer defined workload is described in detail with reference to FIGS. 6b-6c. Initially, at STEP 620 (FIG. 6b), SMF records of a particular type (e.g., type 110, subtype 1) are selected from the input SMF file and sorted. In one example, they are sorted into ascending CICS transaction start time sequence within ascending CICS UOW sequence. The selected and sorted records are then output to Work File 1.

Thereafter, at STEP 622, workload definitions file 602 is input to the process. Each input Work File 1 record is analyzed for a CICS transaction name meeting any workload lead transaction WiTj specification and other workload selection criteria (WiOTj), if defined. A record is written to the output Work File 2, when the workload selection criteria is met. In one embodiment, the record includes the CICS UOW field; the workload name, WNi, field corresponding to the matched WiTj; and the transaction start time. In other embodiments, additional, less, and/or different fields may be included.

At STEP 624, the records of Work File 2 are input to the tracking process and a search is performed for unique CICS UOW fields. When a unique value of the CICS UOW field is encountered on the input file, a record is written to the output UOW trigger file 608. In one embodiment, the record includes the CICS UOW field and the workload name (WNi) field. Again, in other embodiments, additional, less, and/or different fields may be included.

Next, at STEP 626, a comparison is performed with records in the input UOW trigger file with records in the input Work File 1 on the common CICS UOW field. For each match, a record is written to the output CICS workloads file 610. In one embodiment, the record includes the fields of both the matched records. However, in other embodiments, additional, less, and/or different fields may be included.

Additionally, in this example, at STEP 628 (FIG. 6*c*), SMF records of another type (e.g., type 101, subtype 0) are selected and sorted. In one example, the selected records are sorted into ascending DB2 UOW sequence. The selected and sorted records are output to Work File 1.

Subsequently, the records of the input UOW trigger file are compared with the records of the input Work File 1 using the CICS UOW from the UOW trigger file records and the DB2 UOW from the Work File 1 records. For each match, a record is written to the output DB2 workloads file 612. In one example, the record includes the fields of both the matched records. However, again, in other embodiments, additional, less, and/or different fields may be included.

Thus, with the above processing, a customer can determine the amount of resources expended for a particular workload by analyzing the CICS workloads file and/or the DB2 workloads file. This provides an operational view for the customer (e.g., the amount of resources used by a particular workload, amount of resources available to a particular workload, etc.). In a further embodiment, processing may be provided to merge the records of the various workloads files to provide one output.

One example of using the processing of FIGS. 6*a*-6*c* is described below with reference to the SMF records depicted in FIG. 5. Initially, at STEP 620, the two SMF records of FIG. 5 corresponding to type 110, subtype 1 (e.g., records 530, 560) are selected from the SMF file and written to Work File 1, after being sorted into ascending start time sequence within ascending CICS UOW sequence. At STEP 622, the workload definitions file is input, which indicates that the workload lead transaction, WiTj, has a value of TRN1. Thus, the process of analyzing the two input Work File 1 records against the one workload lead transaction having the value of TRN1 results in one Work File 2 record. The record includes, for instance, the CICS UOW value of 879, the WNi workload name of 'Example Workload Name', and a start time value of 29MAR2001:10:00:01.000000.

At STEP 624, the one Work File 2 record is input and written to the UOW trigger file, since that input record meets the criteria of having a unique value for the CICS UOW of 879. The output record includes the CICS UOW value of 879, and the WNi workload name of 'Example Workload Name'.

At STEP 626, the match of the one record from the UOW trigger file with the two Work File 1 records results in the two records illustrated in FIG. 8*a* being written to the CICS workloads file.

Further, at STEP 628, the two SMF records of FIG. 5 corresponding to type 101, subtype 0 (e.g., records 500, 520) are selected and written to Work File 1, after sorting them into ascending DB2 UOW sequence.

At STEP 630, the match of the one record with the CICS UOW of 879 from the UOW trigger file with the two Work File 1 records results in two records being written to the DB2 workloads file, as shown in FIG. 8*b*.

A further example of the processing of FIG. 6*a*-6*c* is described with reference to FIG. 9. In this example, the workload definitions file includes two definitions, each having a value of '**' as the workload lead transaction. This indicates that all transaction names are, at least initially, to be selected. Further, in this example, the W1OT1 has a value of 'CICS Name=CICSA'. The logical construction of W1T1, 'select all transaction names' and W1OT1, 'CICS Name=CICSA' causes record 560 of FIG. 5 to be selected during processing STEP 622. Similarly, the logical construction of W2T1, 'select all transaction names', and W2OT1 'CICS Name=CICSB' causes record 530 of FIG. 5 to be selected during processing STEP 622**.

The processing continues as above. However, in this case, the records of the CICS workloads file and DB2 workloads file have a workload name of 'CICSA Origin Workload', instead of 'Example Workload Name'. This is because in process STEP 624 the first record having a UOW of 879 that was encountered is from the CICSA record illustrated in record 560, since that record has a start time value of 29MAR2001:10:00:01.000000, which is logically before the other record selected by process STEP 620 (e.g., record 530 of FIG. 5 having a start time value of 29MAR2001:10:00:02.000000). This example illustrates that, in accordance with an aspect of the present invention, more than one workload can have the same lead transaction name. Further, it illustrates a flexible technique of assigning workload lead transactions WiTj names by using the '****' wild card terminology.

In yet a further example, the workload definitions depicted in FIG. 9 can be used by an aspect of the present invention to create workloads 'CICSA Origin Workload' and 'CICSB Origin Workload'. This occurs, for instance, if TRN1 is submitted by the user of the system to process CICSB, as well as CICSA, allowing the CICS workloads to be identified by the process name of the process that executed the lead transaction, TRN1. The ability to identify CICS and DB2 SMF records by a workload name that identifies the name of the process that executed the lead transaction of the workload is an attribute of an aspect of the present invention.

Described in detail above is a capability for tracking customer defined workloads. In one example, the workload definitions file is created manually and used by the tracking process executing within the computing environment. However, in another embodiment, one or more aspects of creating the workload definitions file can be automated.

Further, although in the examples described herein, both a CICS Workloads File 610 and a DB2 Workloads File 612 are created, in other embodiments, a CICS Workloads File can be created without creating a DB2 Workloads File (e.g., by omitting process STEPS 628 and 630); or a DB2 Workloads File can be created without creating a CICS Workloads File (e.g., by omitting process STEP 626). Yet further, other types of files (in addition to or in lieu of) can be generated to support other types of systems, such as IMS, MQSeries, WebSphere, etc. Again, CICS and DB2 are only offered as examples.

Yet further, the computing environment described above is only one example. In a further embodiment, the computing environment includes a plurality of processors coupled to one another to process workloads. For instance, one workload may be processed by a plurality of systems executing on various processors. Further, there may be a plurality of SMF files on one or more storage mediums. In such environments, prior to executing the tracking process by a particular processor, the appropriate records of the SMF files are accumulated and the tracking process uses the resulting SMF file as input to its tracking process.

Additionally, the SMF records may have additional, less, and/or different fields depending on the systems processing the work. Further, a mechanism, such as SMF, is not needed. Other techniques for capturing resources used during process activity and writing output records can be utilized.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A system of tracking workloads of a computing environment, said system comprising:
    a processor, the processor employing:
    a workload definition corresponding to a customer defined workload to be tracked, the workload definition comprising a customer provided workload name and a customer provided identification of one or more lead transactions only for the customer defined workload, wherein each execution of each lead transaction employs a unique identification which is assigned and maintained by the computing environment in processing the customer defined workload;
    means for tracking, using the customer provided workload name, the identification of the one or more lead translations, and the unique identification, the customer defined workload after being processed by one or more systems of the computing environment, wherein the means for tracking employs completed process records of the computing environment;
    wherein the one or more lead transactions invoke one or more secondary transactions, the one or more secondary transactions inheriting the unique identification(s) of the one or more lead transactions; and
    wherein the means for tracking comprises means for separately tracking, using a plurality of workload definitions, a pluraliw of customer defined workloads and wherein at least some customer defined workloads share a transaction during the processing thereof by the computing environment.

2. The system of claim 1, wherein the customer defined workload comprises less than a system workload processed by a system of the one or more systems, wherein multiple customer defined workloads are processed concurrently by the one or more systems.

3. The system of claim 1, wherein the one or more systems are executing on one or more mainframe computers of the computing environment.

4. The system of claim 1, wherein the means for tracking comprises means for producing one or more outputs indicating one or more resources used during processing of the customer defined workload.

5. The system of claim 1, wherein the workload definition further comprises at least one of a workload name and one or more selection criteria.

6. At least one program storage device readable by a machine tangibly embodying at least one program of instructions executable by the machine to perform a method of tracking workloads of a computing environment, said method comprising:
    creating a workload definition corresponding to the customer defined workload to be tracked, the workload definition comprising a customer provided workload name and a customer provided identification of one or more lead transactions only for the customer defined workload, wherein each execution of each lead transaction employs a unique identification which is assigned and maintained by the computing environment in processing the customer defined workload;
    employing completed process records of the computing environment in tracking, using the customer provided workload name, the identification of the one or more lead transactions, and the unique identification, the customer defined workload after being processed by one or more systems of the computing environment;
    wherein the one or more lead transactions invoke one or more secondary transactions, the one or more secondary transactions inheriting the unique identification(s) of the one or more transactions; and
    wherein the creating comprises creating a plurality of workload definitions to be used in tracking a plurality of customer defined workloads, and wherein the tracking comprises separately tracking, using the plurality of workload definitions, the plurality of customer defined workloads and wherein at least some customer defined workloads share a transaction during the processing thereof by the computing environment.

7. The at least one program storage device of claim 6, wherein the customer defined workload comprises less than a system workload processed by a system of the one or more systems, wherein multiple customer defined workloads are processed concurrently by the one or more systems.

8. The at least one program storage device of claim 6, wherein the one or more systems are executing on one or more mainframe computers of the computing environment.

9. The at least one program storage device of claim 6, wherein the tracking comprises producing one or more outputs indicating one or more resources used during processing of the customer defined workload.

10. The at least one program storage device of claim 6, wherein the workload definition further comprises at least one of a workload name and one or more selection criteria.

11. The at least one program storage device of claim 6, wherein the tracking comprises:
    determining a unit of work value associated with the customer defined workload, the unit of work value being the unique identification of the respective lead transaction's execution; and
    using the unit of work value to track one or more resources utilized by the customer defined workload.

12. The at least one program storage device of claim 6, wherein the tracking comprises:
    searching one or more records of a first type, produced from processing one or more workloads within the computing environment, for at least one record corresponding to the workload definition;

determining from the at least one record a unit of work value; and identifying at least one record of the one or more records having the unit of work value.

13. The at least one program storage device of claim 12, wherein said method further comprises searching one or more records of a second type for one or more other records having the unit of work value.

14. The at least one program storage device of claim 13, wherein the one or more records of the first type correspond to one or more Computer Information Control System transactions, and wherein the one or more records of the second type correspond to Database 2 activity.

15. The at least one program storage device of claim 12, wherein the one or more records are sorted in a defined order.

16. The at least one program storage device of claim 15, wherein the defined order comprises ascending unit of work sequence order.

17. The at least one program storage device of claim 16, wherein the defined order further comprises ascending start time sequence within the ascending unit of work sequence order.

* * * * *